Aug. 5, 1930.  G. D. BRADSHAW  1,772,037

FLUID SEPARATOR

Filed Oct. 20, 1925

INVENTOR:
Grant D. Bradshaw
BY
E. J. Andrews
ATTORNEY.

Patented Aug. 5, 1930

1,772,037

UNITED STATES PATENT OFFICE

GRANT D. BRADSHAW, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed October 20, 1925. Serial No. 63,803.

This invention relates to improvements in fluid separators for purifying or drying gases by separating from the gases any vapor that may be mixed therewith; and the invention relates particularly to separators to be used in steam power plants for separating the moisture and other impurities from the steam which is being used or in oil refining plants for separation of impurities from the gases. One of the objects of the invention is to provide a simple and inexpensive apparatus that will very completely dry and purify the steam or other gases when properly installed and used.

Figure 1:
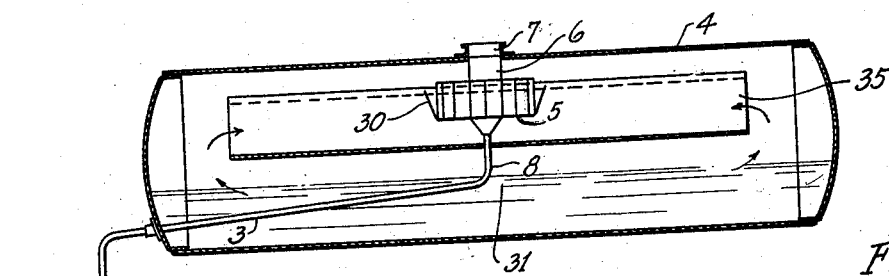
Figure 2:
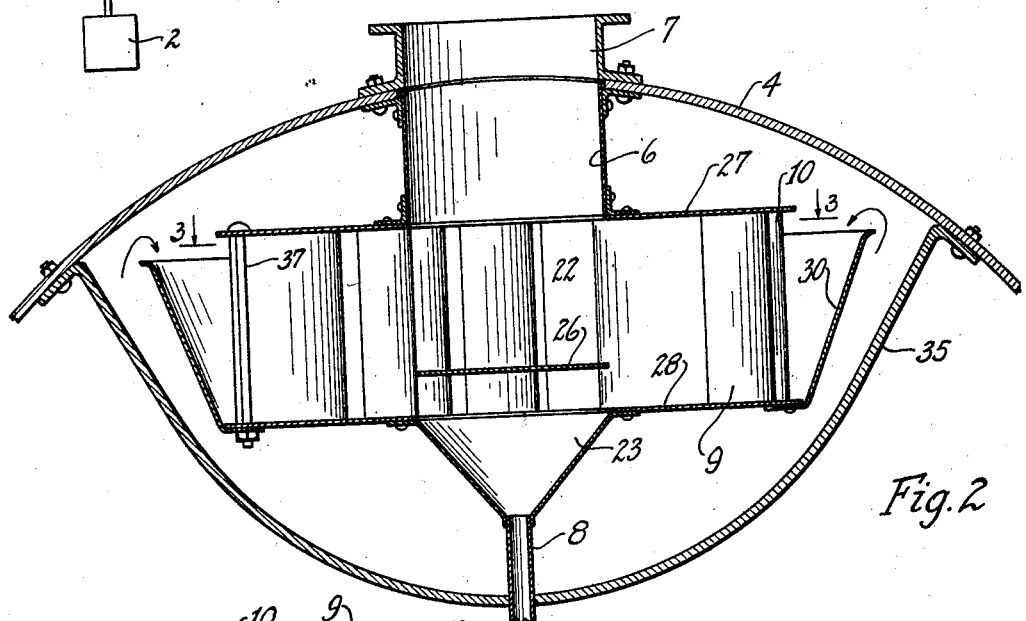
Figure 3:
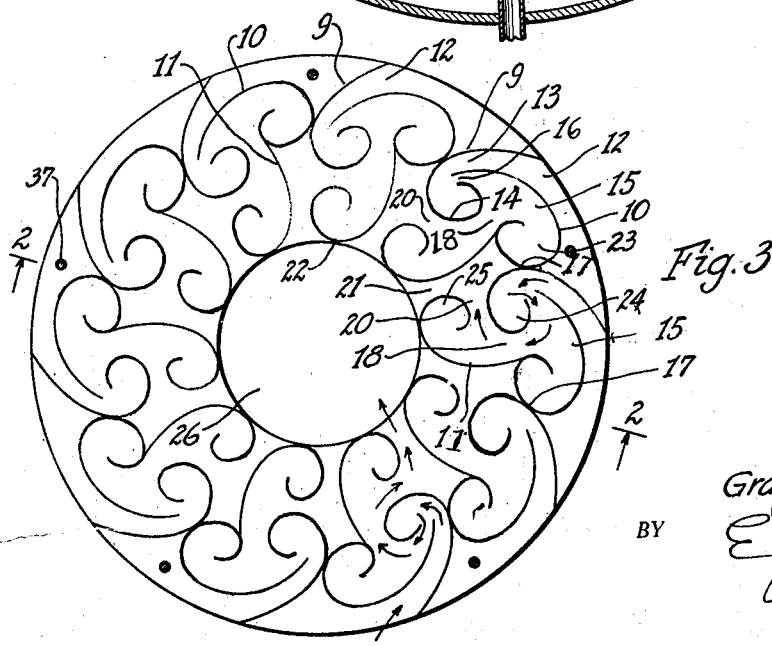

Of the drawings Fig. 1 is an elevation of a steam separator which embodies features of my invention, showing it as installed in a steam boiler; Fig. 2 is an enlarged sectional vertical view of the separator along the line 2—2 of Fig. 3; and Fig. 3 is a horizontal sectional view along the line 3—3 of Fig. 2.

As is well understood, the separation of moisture and other impurities from steam results when the steam is thrown against the baffles as the moisture adheres to the surface of the baffles and runs downwardly and can be drained away, while the steam flows away from the baffle surface and passes to the outlet and into the steam main. I have found it desirable, however, in order to more perfectly separate the liquid from the gas, to take advantage of the centrifugal effect on the flowing moisture so as to throw it out of the current of gas against the baffles; and this is one of the objects of my invention.

In the boiler 4 is mounted the separator 5, the steam outlet 6 of which is connected to the steam main 7 of the boiler system; and the separator has a water outlet 8 through which the separated water flows preferably into a steam trap 2 through the pipe 3.

Between this inlet and outlet of the separator are a plurality of baffles 9, 10 and 11, which are adapted to act upon the steam and moisture as they flow through the separator. The steam is at liberty to enter the separator at any of the inlets 12 spaced around the separator, and, passing into the corresponding narrowing passageway 13, the speed of the steam is increased and the moisture is thrown against the curved surface 14 of the baffles while the steam passes on into the chamber 15 formed by the next baffle through the passageway 16. From this chamber 15 the moisture is thrown onwardly against the curved surface 17 and the steam passes on through the passageway 18 formed by the next baffle 11. The steam then passes through the passageways 20 and 21 into the central passageway 22, while the moisture which has adhered to the various surfaces of the baffles flows downwardly and finally into the chamber 23 and out of the water outlet 8. The arrows indicate the general path of the steam, it being understood that the chambers formed by the curved ends of the baffles will be filled with steam, the back pressure of which will prevent steam from flowing into the chambers and will force it in the directions indicated by the arrows.

The steam, therefore, flows through a series of three curved baffles 9, 10 and 11, starting in at any one of the inlets 12 and passing out of the corresponding outlet 21. Each of these outlets communicates with an inner passageway 22 and hence all of the steam passes into this passageway and upwardly out of the outlet 6 into the steam main 7. A plate 26 is inserted in the chamber 22 near the lower portion thereof to separate the steam in the chamber 22 from the water in the chamber 23 and the upper and lower ends of the baffles are closed by the respective annular plates 27 and 28 so that the steam is forced to enter at the inlets 12 at the periphery of the separator.

An annular side plate 30 may be fixed to the separator in any suitable manner so as to force the steam upwardly and over the edges of this plate and thus to separate it as much as possible from the moisture in the boiler. This is particularly desirable in some boilers for the reason that near the central portion thereof the water 31 is elevated by the effects of the fire and by the reduced pressure owing to the passage of steam out of the boiler over this portion. To further assist in separating the steam from the water in the boiler a trough baffle 35 may be provided and fixed to the upper portion of the boiler as indicated so as to force the steam to pass into the ends of the trough, and hence from the ends of the boiler, and thus to pass into the separator.

The baffles at the points of contact are preferably welded together, and the edges are preferably welded to the plate 28. The plates 27 and 28 are detachably connected together by means of bolts 37. This allows the baffles to be removed for any purpose, such as cleaning them.

It will be noticed that the baffles increase in curvature as the inner or outlet ends are approached. This provides for gradually curving the path of motion of the steam, and gives increased centrifugal effect. Also the baffles of the second annular row are curved in a direction opposite to the curvature of the baffles of the first annular row. This forces the steam to reverse its curved path as it passes from one row to the other. Also a novel feature of centrifugal separators embodied in this invention is maintaining complete separation of the dried gas and the liquid after they pass away from the baffles. This results from the use of the plate 26. Another novel feature is the use of a plurality of complete stages of centrifugal separators, in this instance three stages are shown and suitably associated with each other.

Generally in practice it will be understood that the exact shape of the interior baffles of the separator and the number and size thereof is not a material part of my invention as modifications therein could be made by those skilled in the art without departing from the spirit of my invention as set forth in the following claims.

I claim as my invention:

1. A fluid separator comprising a casing having a top and a bottom wall and having a fluid inlet at its side portion, a liquid outlet at its lower inner portion, and a gas outlet at its upper inner portion, and means arranged to form a path of travel for fluids from said inlet to said outlets, said means including a curved baffle vertically mounted in said casing between said outlets and inlet, the curvature of said baffle varying and increasing as the outlets are approached, the upper and lower edges of said baffle coming in contact with the respective top and bottom walls of said casing, and a second similarly curved baffle mounted with its end having the least curvature adjacent the end of the other baffle having the most curvature, the second baffle extending from the said adjacent ends towards said inlet.

2. A fluid separator comprising a casing having a top and a bottom wall and having a fluid inlet at its side portion, a liquid outlet at its lower inner portion, and a gas outlet at its upper inner portion, and means arranged to form a path of travel for fluids from said inlet to said outlets, said means including a curved baffle vertically mounted in said casing between said outlets and inlet, the curvature of said baffle varying and increasing as the outlets are approached, the upper and lower edges of said baffle coming in contact with the respective top and bottom walls of said casing, and a second similarly curved baffle mounted with its end having the least curvature adjacent the end of the other baffle having the most curvature, the curvature of said baffles in passing from the ends of greater curvature being in opposite directions.

3. A fluid separator comprising a casing having a fluid inlet at its side portion, a liquid outlet at its lower inner portion, and a gas outlet at its upper inner portion, and means arranged to form a path of travel for fluids from said inlet to said outlets, said means including a curved baffle vertically mounted in said casing between said outlets and inlet, the curvature of said baffle varying and increasing as the outlets are approached, the upper and lower edges of said baffle coming in contact with the respective top and bottom walls of said separator, and a second similarly curved baffle mounted with its end having the least curvature adjacent the end of the other baffle having the most curvature, and a third similar baffle mounted with its end of least curvature in contact with said second baffle near its end having the greatest curvature.

4. A fluid separator comprising a casing having a top and a bottom wall and having a fluid inlet at its side portion, a liquid outlet at its lower inner portion, and a gas outlet at its upper inner portion, means arranged to from a path of travel from said inlet to said outlet, said means comprising a curved baffle vertically mounted in said casing between said outlets and inlet, the curvature of said baffle increasing as the outlets are approached, the upper and lower edges of said baffle coming in contact with the respective top and bottom walls of said separator, and a second similar baffle mounted with its end having the least curvature adjacent the end of the other baffle having the most curvature, and a third similar baffle mounted with its end of least curvature in contact with said second baffle near its end having the greatest curvature, the direction of curvature of said third baffle in passing from the ends in contact being opposite to that of the second baffle.

5. A fluid separator comprising a casing having a fluid inlet at its side portion, a liquid outlet at its lower inner portion, and a gas outlet at its upper inner portion, and means arranged to form a path of travel from said inlet to said outlet, said means comprising a curved baffle vertically mounted in said casing between said outlets and inlet, the curvature of said baffle varying and increasing as the outlets are approached, and a second similarly curved baffle mounted with its end having the least curvature adjacent the end of the other baffle having the most curvature, and a third similar baffle mounted with its end of least curvature in contact with said second baffle near its end having the greatest curvature, the direction of curvature of said third baffle being opposite to that of the second baffle, the upper and lower edges of all of said baffles being in contact with the respective top and bottom walls of said separator.

6. A fluid separator comprising a circular casing having a fluid inlet at its side portion, a liquid outlet at its lower inner portion, and a gas outlet at its upper inner portion, and means arranged to form paths of travel from said inlet to said outlet, said means comprising a series of curved baffles vertically mounted in said casing between said outlets and inlet, the curvature of said baffles varying and increasing as the outlets are approached, the upper and lower edges of said baffles coming in contact with the respective top and bottom walls of said separator, and a second series of similarly curved baffles, each mounted with its end of least curvature positioned between the adjacent walls of one of said first mentioned baffles but spaced therefrom, and a plurality of fluid inlets disposed around the periphery of the casing being formed by pairs of baffles, one from each series.

7. A fluid separator comprising a flat annular top and a similar flat annular bottom, said top having a gas outlet in its central portion, and a plurality of curved baffles vertically mounted with their respective upper and lower edges in contact with said top and bottom, a liquid outlet communicating with the central portion of said bottom, said baffles being arranged in stages, all of the baffles in one stage being similarly arranged with reference to said separator but being arranged unlike those of an adjacent stage, the baffles of one stage being alternatingly disposed with reference to the baffles of the adjacent stage, and each pair of adjacent baffles forming a gas inlet between their walls.

8. A fluid separator comprising a flat annular top and a similar flat annular bottom, and a series of curved baffles vertically mounted with their respective upper and lower edges in contact with said top and bottom, a liquid receiving chamber in the central lower portion of said separator, a liquid outlet communicating with the said chamber, a gas outlet communicating with the central portion of said top, and a plate mounted horizontally between said outlets, near the lower portion of said separator and above said chamber and filling the entire space between the inner portions of said baffles.

9. A fluid separator having a gas outlet communicating with the central portion of the top and a liquid outlet communicating with the central portion of the bottom of said separator, and an open-end trough-shaped baffle adapted to be fixed to the upper wall of a gas generator with its side edges in contact therewith, said separator being adapted to be fixed to said inner wall above said trough baffle.

10. The combination of an elongated boiler having a steam outlet, a steam separator mounted in the central upper portion of said boiler beneath the main upper wall thereof and having a steam outlet communicating with the steam outlet of said boiler, and an elongated open end trough baffle supported adjacent the upper wall of said boiler and extending from adjacent one end to the other of said boiler, the sides of said baffle projecting upwardly to and coming in contact with the wall of said boiler outside of said separator.

11. The combination of an elongated boiler having a steam outlet, a steam separator mounted in the upper portion of said boiler and having a steam outlet communicating with the steam outlet of said boiler, and an elongated open-end trough baffle supported adjacent the upper wall of said boiler and extending from adjacent one end to the other of said boiler, the sides of said baffle projecting upwardly to the wall of said boiler outside of said separator, and a baffle encircling said separator with the lower edge of its wall connected to the lower portion of said separator.

12. The combination of a gas generator having a gas outlet, an elongated open-end trough mounted in said generator with the upper edges of its sides forming substantially gas tight connection with the under surface of the upper wall of said generator, and gas purifying means mounted in said trough beneath the main upper wall of the generator and communicating with said outlet.

In testimony whereof, I hereunto set my hand.

GRANT D. BRADSHAW.